(12) United States Patent
Zhang et al.

(10) Patent No.: US 7,443,157 B2
(45) Date of Patent: Oct. 28, 2008

(54) DEVICE AND METHOD FOR PLANENESS TESTING

(75) Inventors: Bing-Jun Zhang, Shenzhen (CN);
Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/733,210

(22) Filed: Apr. 10, 2007

(65) Prior Publication Data

US 2008/0041142 A1 Feb. 21, 2008

(30) Foreign Application Priority Data

Aug. 18, 2006 (CN) .................... 2006 1 0062210

(51) Int. Cl.
*G01R 31/28* (2006.01)
*G01R 31/02* (2006.01)
*G01C 15/00* (2006.01)
*G01B 21/22* (2006.01)

(52) U.S. Cl. ............... 324/158.1; 324/758; 33/286; 33/533

(58) Field of Classification Search ........... 324/158.1, 324/758; 33/286, 533
See application file for complete search history.

(56) References Cited

U.S. PATENT DOCUMENTS

| 5,687,487 | A  | * | 11/1997 | Johnson .................... 33/501.02 |
| 6,043,668 | A  | * | 3/2000  | Carney ........................ 324/758 |
| 6,354,013 | B1 | * | 3/2002  | Mucke et al. ................. 33/533 |
| 2004/0113640 | A1 | * | 6/2004 | Cooper et al. ............... 324/754 |
| 2005/0024040 | A1 | * | 2/2005 | Martin et al. ............ 324/158.1 |

* cited by examiner

*Primary Examiner*—Ha Nguyen
*Assistant Examiner*—Karen M Kusumakar
(74) *Attorney, Agent, or Firm*—Frank R. Niranjan

(57) ABSTRACT

A device for testing planeness of an electrically conductive workpiece includes a platform for supporting the workpiece, a testing box movably fixed above the platform, an indicator, and a power supply. The testing box has a contact pin fixed on a bottom surface of the testing box. The contact pin is electrically wired in series with one electrode of the power supply. The platform is electrically wired in series with the other electrode of the power supply. The indicator is electrically wired in series with a testing circuit, which is made up of the power supply, the platform, and the contact pin. The contact pin is capable of movement above the platform at a distance which is equal to the sum of a thickness of the workpiece and a desired tolerance of the planeness, wherein if the planeness of the workpiece between the contact pin and the platform is out of tolerance, the testing circuit is closed, conducting power to the indicator, which will then indicate that the workpiece is ineligible.

19 Claims, 5 Drawing Sheets

DEVICE AND METHOD FOR PLANENESS TESTING

BACKGROUND OF THE INVENTION

1. Field of the Invention

The present invention relates to a device and method for planeness testing, and more particularly to a device and method for testing planeness of an electrically conductive workpiece.

2. Description of Related Art

An electrically conductive workpiece, such as a metal plate, after processing of punching or other machining processes, is easy to be deformed. Thus it is necessary to test the planeness of the electrically conductive workpiece.

Typically, a plug gauge is used for testing the planeness of the workpiece. The workpiece is placed on a flat support, a plurality of clearances occur between different zones of the workpiece and the flat support. Attempts are made to insert the plug gauge into the clearances. The planeness of the workpiece is eligible if the plug gauge cannot fit into any of the clearances of the workpiece. However, this method is unduly labor intensive, time-consuming, and inefficient when done by an operator.

What is needed, therefore, is a laborsaving and convenient device and method for planeness testing.

SUMMARY OF THE INVENTION

A device for testing planeness of an electrically conductive workpiece includes a platform for supporting the workpiece, a testing box movably fixed above the platform, an indicator, and a power supply. The testing box has a contact pin fixed on a bottom surface of the testing box. The contact pin is electrically wired in series with one electrode of the power supply. The platform is electrically wired in series with the other electrode of the power supply. The indicator is electrically wired in series with a testing circuit, which is made up of the power supply, the platform, and the contact pin. The contact pin is capable of movement above the platform at a distance which is equal to the sum of a thickness of the workpiece and a desired tolerance of the planeness, wherein if the planeness of the workpiece between the contact pin and the platform is out of tolerance, the testing circuit is closed, conducting power to the indicator, which will then indicate that the workpiece is ineligible.

A method for testing planeness of an electrically conductive workpiece, includes:

placing the workpiece on a platform of a device for testing planeness;

operating the device to drive a contact pin of the device to move toward the platform until a distance between the contact pin and the platform is equal to the sum of the thickness of the workpiece and a desired tolerance of the planeness; and indicating that the workpiece is ineligible if the contact pin contacts with the workpiece.

Other advantages and novel features will become more apparent from the following detailed description of a preferred embodiment when taken in conjunction with the accompanying drawings, in which:

DETAILED DESCRIPTION OF THE INVENTION

Figure 1:
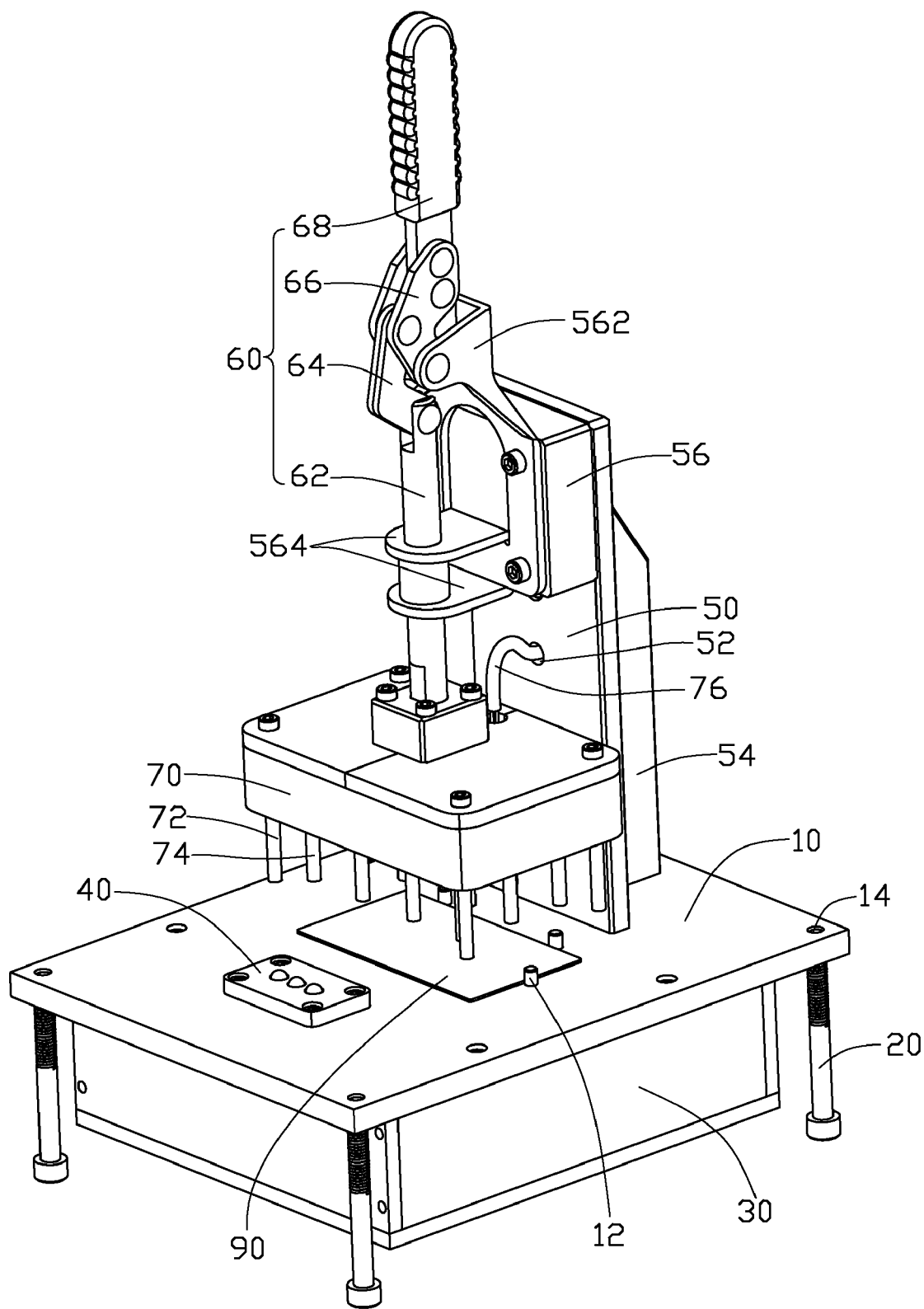
FIG. 1 is an assembled, isometric view of a device for testing planeness of an electrically conductive workpiece in accordance with a preferred embodiment of the present invention.

Referring to FIG. 1, a device is provided in accordance with a preferred embodiment of the present invention, for testing the planeness of an electrically conductive workpiece 90. The device includes a platform 10, four supports 20 mounted to four corners of the platform 10 respectively, for supporting the platform 10, a power supply 30 fixed under the platform 10, an indicator 40 mounted on a front portion of the platform 10, a bracket 50 mounted on a rear portion of the platform 10, a holding structure 60 movably mounted to the bracket 50, and a testing box 70 mounted to the holding structure 60 above the platform 10.

A plurality of locating posts 12 extend from a middle portion of the platform 10. A screw hole 14 is defined in each corner of the platform 10.

In this preferred embodiment of the present invention, the supports 20 are four screws 20. Each screw 20 is screwed into a corresponding screw hole 14. The screws 20 are used for adjustably supporting the platform 10.

The indicator 40 has three indicator lights, which are red, yellow, and green, respectively. The indicator lights can be replaced with a plurality of buzzers or other signaling devices.

The bracket 50 defines a through hole 52 in a middle thereof. A cover 54 is fixed to a back surface of the bracket 50. A mounting block 56 extends from a top portion of the bracket 50. Two arms 562 extend forward from a top portion of the mounting block 56. Two locating portions 564 extend forward and upward from a bottom portion of the mounting block 56. A hole is defined in a free end of each locating portion 564.

The holding structure 60 includes a connecting pole 62, an L-shaped first pivot member 64, an L-shaped second pivot member 66, and a handle 68. One end of the second pivot member 66 is pivotably connected to the arms 562 between the arms 562, the other end of the second pivot member 66 is fixed to the handle 68. One end of the first pivot member 64 is pivotably connected to a middle portion of the second pivot member 66, the other end of the first pivot member 64 is pivotably connected to a top end of the connecting pole 62. The connecting pole 62 extends through the holes of the locating portions 564 in succession.

Figure 4:
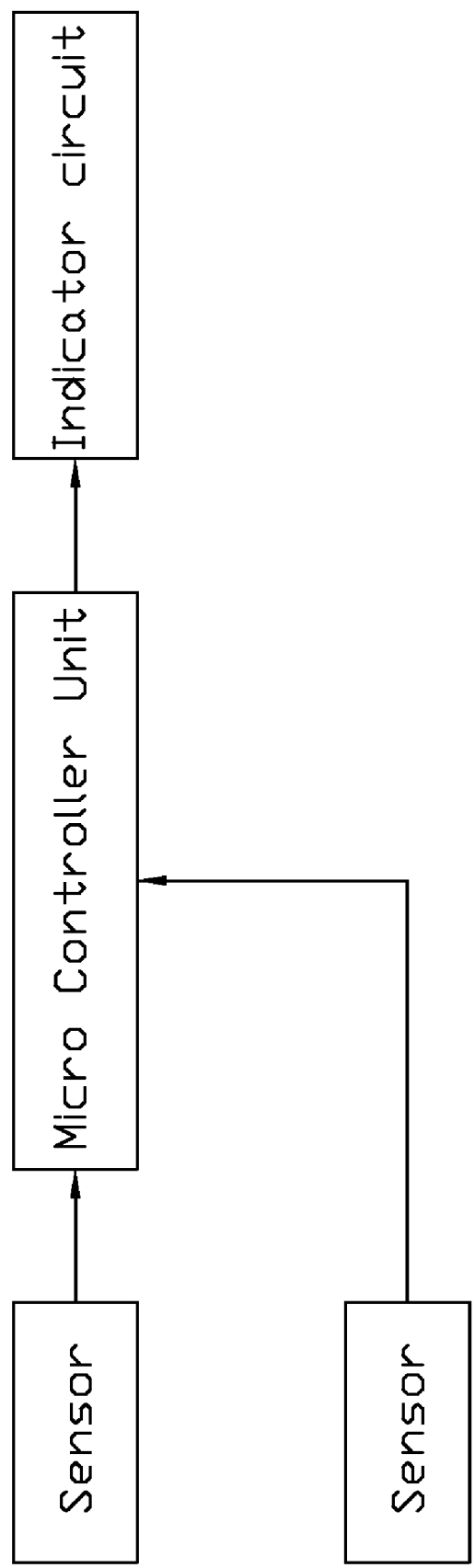
FIG. 4 is a circuit diagram showing the principle of the device for testing planeness of the workpiece.

Referring also to FIG. 4, a top portion of the testing box 70 is fixed to a bottom end of the connecting pole 62. Four restricting rods 72 are mounted to four corners of the testing box 70, respectively. Each restricting rod has a pressure sensor attached to a bottom end thereof. A plurality of contact pins 74 extends downward from a bottom surface of the testing box 70. Each contact pin 74 also has a pressure sensor attached to a bottom end thereof. An MCU (Micro Controller Unit) is electrically connected to the pressure sensors of the restricting rods 72 and the contact pins 74 in the testing box 70 for receiving signals sent from the pressure sensors of the restricting rods 72 and the contact pins 74. A cable 76 is electrically connected to the testing box 70 and extends through the through hole 52 of the bracket 50 and the platform 10 to electrically connect to the power supply 30. The indicator 40 is wired electrically in series with an indicator circuit.

Figure 2:
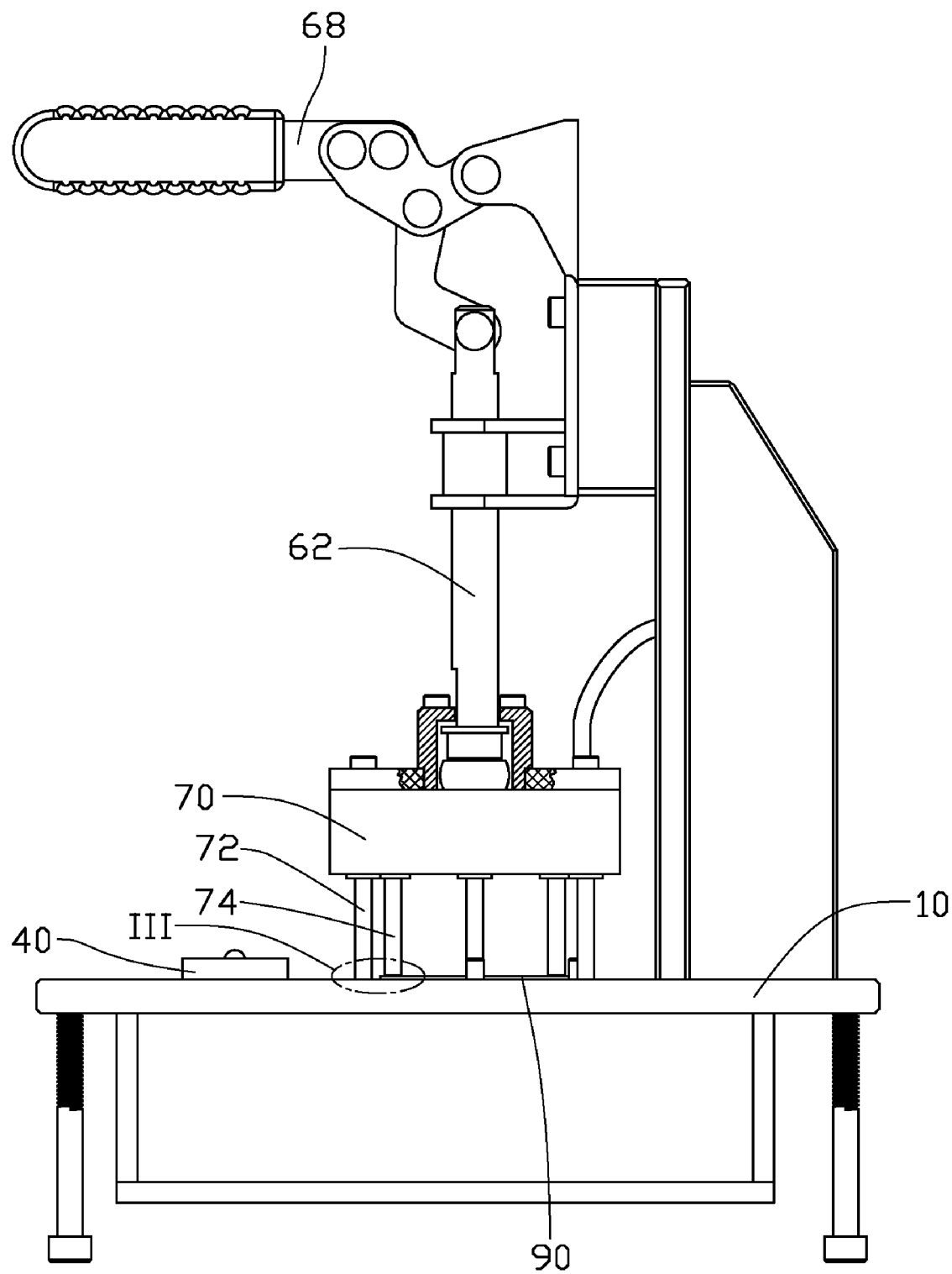
FIG. 2 is a side elevational view of FIG. 1, showing a using state of the device.
Figure 3:
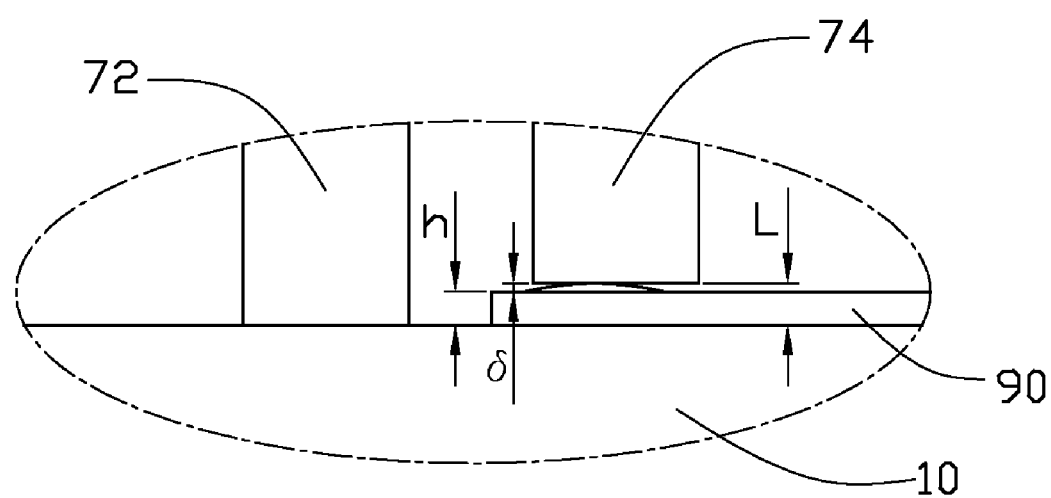
FIG. 3 is an enlarged view of a circled portion III of FIG. 2.

Referring also to FIGS. 2 and 3, in use, when the device is powered up the yellow indicator light will turn on. If neither the green indicator light nor the red indicator light is lit, then a ready condition is indicated and the workpiece 90 can be put on the platform 10. Then the workpiece 90 is put on the platform 10. The workpiece 90 is located via the locating posts 12. The handle 68 of the holding structure 60 is pulled downward to pivot the second pivot member 66, urging the first pivot member 64 to move the connecting pole 62 along the holes of the locating portion 564, thus lowering the restricting rods 72 in unison with the contact pins 74. When the restricting rods 72 of the testing box 70 are stopped by the platform 10, the contact pins 74 are at a position above the platform 10 at a distance L, which is equal to the sum of a thickness h of the workpiece 90 and a desired planeness tolerance δ of the workpiece 90. If the planeness tolerance of the workpiece 90 is greater than or equal to δ, one or more of the contact pins 74 contact the workpiece 90, the pressure sensors of the contact pins 74 and the restricting rods 72 send signals to the MCU, the MCU controls the indicator circuit to turn on the red indicator light to indicate that the workpiece 90 is ineligible. If the planeness tolerance of the workpiece 90 is less than δ, none of the contact pins 74 contact the workpiece 90, the pressure sensors of the contact pins 74 and the restricting rods 72 send signals to the MCU, the MCU controls the indicator circuit to turn on the green indicator light to indicate that the workpiece 90 is eligible. If the restricting rods 72 do not engage with the platform 10 but the contact pins 74 contact the workpiece 90, the pressure sensors of the contact pins 74 and the restricting rods 72 send signals to the MCU, the MCU controls the indicator circuit to turn on the red indicator light intermittently to indicate that the operation of putting the workpiece 90 on the platform 10 has created an error condition (i.e. misaligned workpiece 90 or foreign object inserted in work area), therefore an operator should correct the error condition.

Figure 5:
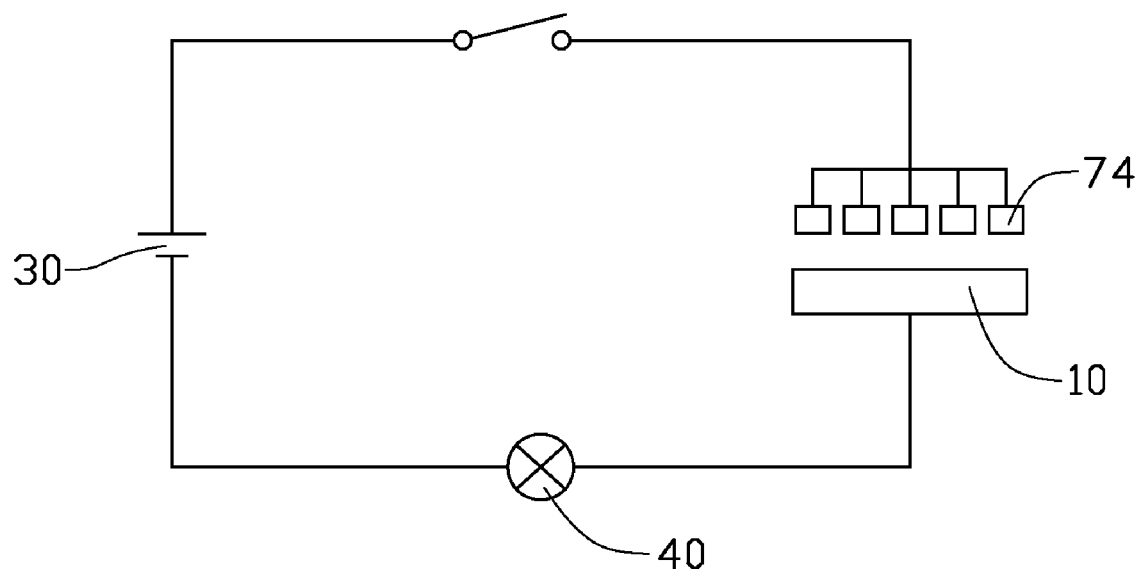
FIG. 5 is a circuit diagram illustrating the principle of the device for testing planeness of the workpiece according to a second embodiment.

As another preferred embodiment of the present invention, the platform 10 is made of electrically conductive material. The restricting rods 72 are made of dielectric material, and the contact pins 74 are made of electrically conductive material. The green indicator light of the indicator 40 and the pressure sensors are omitted. The red indicator light of the indicator 40 is wired electrically in series with the platform 10 and the other electrode of the power supply 30, as shown in FIG. 5. Instead, the red indicator light of the indicator 40 can be electrically wired in series with the contact pins 74 of the testing box 70 and one electrode of the power supply 30. If the planeness of the workpiece 90 is greater than or equal to δ, one or more of the contact pins 74 contact the workpiece 90, the circuit including the power supply 30, the contact pins 74, the platform 10, the red indicator light of the indicator 40 connected in series is completed, therefore the red indicator light turns on to indicate that the workpiece 90 is ineligible. If the planeness of the workpiece 90 is less than δ, the contact pins 74 of the testing box 70 cannot contact with the workpiece 90, the circuit is still an open circuit, thus the red indicator light is not lit indicating that the workpiece 90 is eligible.

The quantity or the sectional size of the contact pins 74 can be adjusted to adapt to the size of the workpiece 90. The contact pins 74 can instead be one contact portion that has a large plane contact surface. During testing of the workpiece 90, the workpiece 90 can be moved on the platform 10 to test the planeness of workpiece 90 in different positions.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A device for testing planeness of an electrically conductive workpiece, comprising:
  a platform for supporting the workpiece thereon;
  a testing box movably fixed above the platform, the testing box having a contact pin fixed on a bottom surface of the testing box;
  a bracket mounted on the platform;
  a holding structure movably fixed to the bracket, the holding structure being connected to the testing box for driving the testing box to move up and down;
  an indicator; and
  a power supply, the contact pin being electrically wired in series with one electrode of the power supply, the platform being electrically wired in series with the other electrode of the power supply, the indicator being electrically wired in series with a testing circuit, which is made up of the power supply, the platform, and the contact pin;
  the contact pin being capable of being positioned above the platform at a distance which is equal to the sum of a thickness of the workpiece and a desired tolerance of the planeness, wherein if the planeness of the workpiece between the contact pin and the platform is out of the desired tolerance, the testing circuit is closed, conducting power to the indicator, which will then indicate that the workpiece is ineligible.

2. The device as claimed in claim 1, wherein the holding structure comprises a connecting pole, a first pivot member pivotably connected to a top end of the connecting pole, a second pivot member pivotably connected to the first pivot member in a middle portion of the second pivot member, and a handle, one end of the second pivot member is mounted to the handle, and the other end of the second pivot member is pivotably connected to the bracket.

3. The device as claimed in claim 2, wherein a mounting block extends from a top portion of the bracket, two locating portions extend forward from the mounting block, a pair of aligned holes is defined in the locating portions for the connecting pole extending through.

4. The device as claimed in claim 1, wherein the indicator comprises an indicator light for indicating whether the planeness of the workpiece is eligible.

5. The device as claimed in claim 1, wherein the indicator comprises a buzzer for indicating whether the planeness of the workpiece is eligible.

6. The device as claimed in claim 1, wherein the platform comprises a plurality of locating posts for locating the workpiece on the platform.

7. The device as claimed in claim 1, wherein a restricting rod extends from the bottom surface of the testing box to for abutting the platform to restrict movement of the testing box.

8. A method for testing planeness of an electrically conductive workpiece, the method comprising:
  providing a device comprising a platform, a testing box movably fixed above the platform, a power supply, and an indicator, the testing box comprising a contact pin at a bottom thereof, a sensor installed at a bottom surface of the contact pin;

connecting one electrode of the power supply to the platform, connecting the other electrode of the power supply to the contact pin, and connecting the indicator in the circuit which is made an of the power supply, the platform, and the contact pin;

placing the workpiece on the platform of the device for testing planeness;

operating the device to drive a contact pin of the device to move toward the platform until a distance between the contact pin and the platform is equal to the sum of the thickness of the workpiece and a desired tolerance of the planeness;

generating a signal from the sensor to a Micro Controller Unit (MCU) which controls the indicator lights to selectively light according to the signals; and indicating the test result, the workpiece is indicated as ineligible if the contact pin contacts with the workpiece; the workpiece is indicated as eligible if the contact pin does not contact with the workpiece.

9. A device for testing planeness of an electrically conductive workpiece, comprising:

a power supply;

an indicator electrically connecting with the power supply;

a platform configured for supporting the workpiece thereon, the platform electrically connecting with one electrode of the power supply;

a testing member comprising a plurality of contact pins and restricting rods located above the platform, the contact pins electrically connecting with the other one electrode of the power supply; wherein the vertical distance between the bottom of the restricting rods and the bottom of the contact pins is fixed and equal to the sum of a thickness of the workpiece and a desired tolerance of the planeness.

10. The device as claimed in claim 9, wherein the indicator comprises an indicator light, which indicates the workpiece is ineligible when the workpiece placed on the platform contacts any one of the contact pins to electrically connect the two electrodes of the power supply.

11. The device as claimed in claim 9, wherein the indicator comprises two indicator lights, and a sensor is installed at a bottom surface of each of the contact pins and restricting rods configured for generating a signal to a Micro Controller Unit (MCU) which controls the indicator lights to selectively light according to the signals.

12. The device as claimed in claim 11, wherein when the restricting rods contact with the platform and any one of the contact pins contacts with the workpiece, the MCU controls one of the lights to light to indicate the workpiece is ineligible.

13. The device as claimed in claim 12, wherein when the restricting rods contact with the platform and none of the contact pins contacts with the workpiece, the MCU controls the other one of the lights to light to indicate the workpiece is eligible.

14. The device as claimed in claim 11, wherein when none of the restricting rods contacts with the platform and any one of the contact pins contacts with the workpiece, the MCU controls one of the lights to light intermittently.

15. The device as claimed in claim 9, further comprising a bracket fixed on one side of the platform, and a holding structure pivotably attached to the bracket, wherein the holding structure comprises a connecting pole being moveable up and down to drive the testing member to move up and down.

16. The method as claimed in claim 8, wherein the device further comprises a bracket mounted on the platform, and a holding structure movably fixed to the bracket, the holding structure being connected to the testing box for driving the testing box to move up and down.

17. The method as claimed in claim 16, wherein the holding structure comprises a connecting pole, a first pivot member pivatably connected to a top end of the connecting pole, a second pivot member pivotably connected to the first pivot member in a middle portion of the second pivot member, and a handle, one end of the second pivot member is mounted to the handle, and the other end of the second pivot member is pivotably connected to the bracket.

18. The method as claimed in claim 17, wherein a mounting block extends from a top portion of the bracket, two locating portions extend forward from the mounting block, a pair of aligned holes is defined in the locating portions for the connecting pole extending through.

19. The method as claimed in claim 8, wherein a restricting rod extends from the bottom surface of the testing box to for abutting the platform to restrict movement of the testing box.

* * * * *